United States Patent [19]

Park

[11] Patent Number: 5,517,478
[45] Date of Patent: May 14, 1996

[54] DISC PLAYER FOR PERFORMING DISC LOADING AND EJECTING IN RESPONSE TO OPENING AND CLOSING OF LID

[75] Inventor: Woo Jin Park, Seoul, Rep. of Korea

[73] Assignee: Daewoo Electronics Co., Ltd., Seoul, Rep. of Korea

[21] Appl. No.: 281,017

[22] Filed: Jul. 27, 1994

[30] Foreign Application Priority Data

Jul. 28, 1993 [KR] Rep. of Korea ............... 93-14382

[51] Int. Cl.$^6$ .................................................. G11B 33/02
[52] U.S. Cl. .................... 369/77.2; 369/77.1; 369/75.2
[58] Field of Search ........................... 369/77.2, 77.1, 369/79, 75.2; 360/99.05; 312/270.1, 270.2, 272.5

[56] References Cited

U.S. PATENT DOCUMENTS

| | | | |
|---|---|---|---|
| 2,608,456 | 8/1952 | Barth | 312/8 |
| 3,658,050 | 4/1972 | Snyder | 126/340 |
| 4,539,669 | 9/1985 | Miyakawa | 369/75.2 |
| 4,669,076 | 5/1987 | Broom et al. | 369/77.1 |
| 4,893,295 | 1/1990 | Matsuura et al. | 369/75.2 |
| 5,067,121 | 11/1991 | Ein Haus | 369/75.2 |
| 5,274,619 | 12/1993 | Suzuki | 369/77.1 |
| 5,299,185 | 3/1994 | Sakurai et al. | 369/75.2 |

*Primary Examiner*—Stuart S. Levy
*Assistant Examiner*—Adriana Giordana
*Attorney, Agent, or Firm*—Nixon & Vanderhye

[57] ABSTRACT

A disc player performs disc loading and ejecting while closing and opening the player lid. The disc player includes a housing having a first guide groove longitudinally formed on an inner side thereof, a deck including a turntable, a moving plate mounted over deck to horizontally move in frontward and rearward directions, a disc tray engaged with the moving plate and for loading and ejecting a disc onto and out of the turntable while vertically moving down and up in response to rearward and frontward movements of the moving plate, a lid engaged with the housing to pivotally close and open, and movement mechanism for controlling the frontward and rearward movements of the moving plate when the lid closes and opens. A simple structure and miniaturization of a disc player can be accomplished since disc loading and ejecting is performed without using a motor and gears.

7 Claims, 5 Drawing Sheets

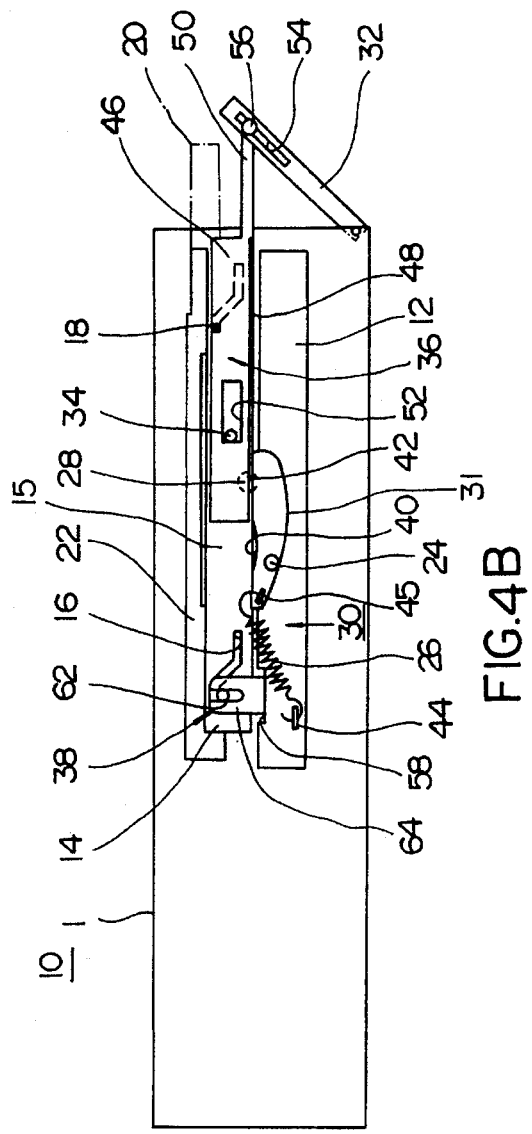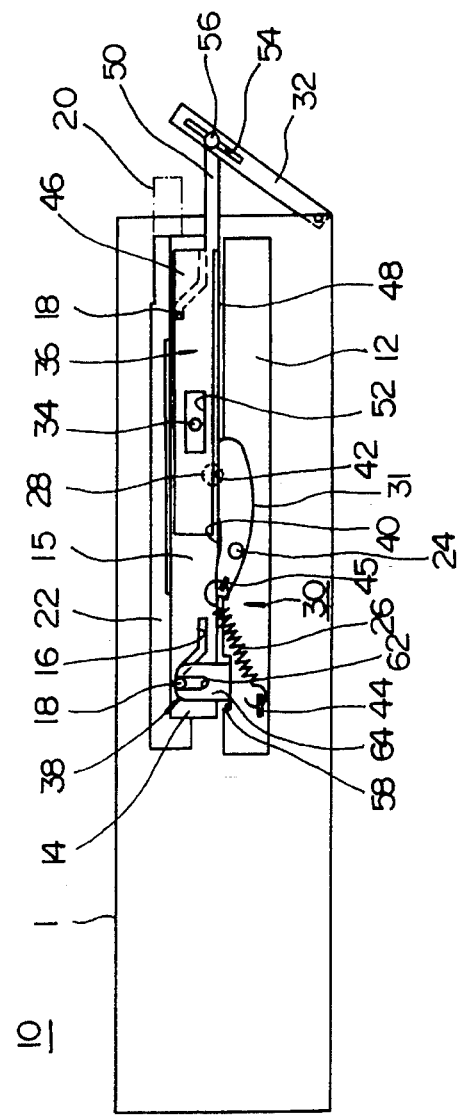

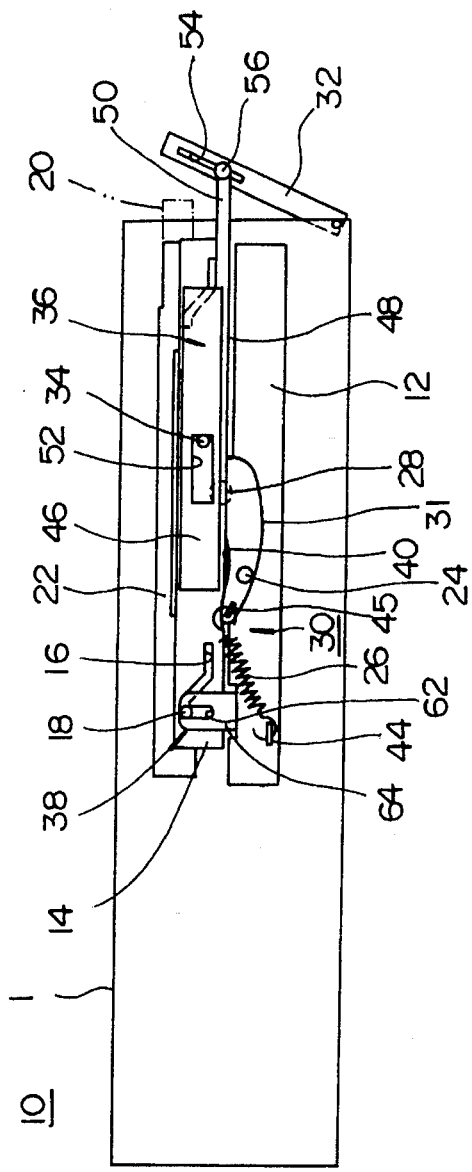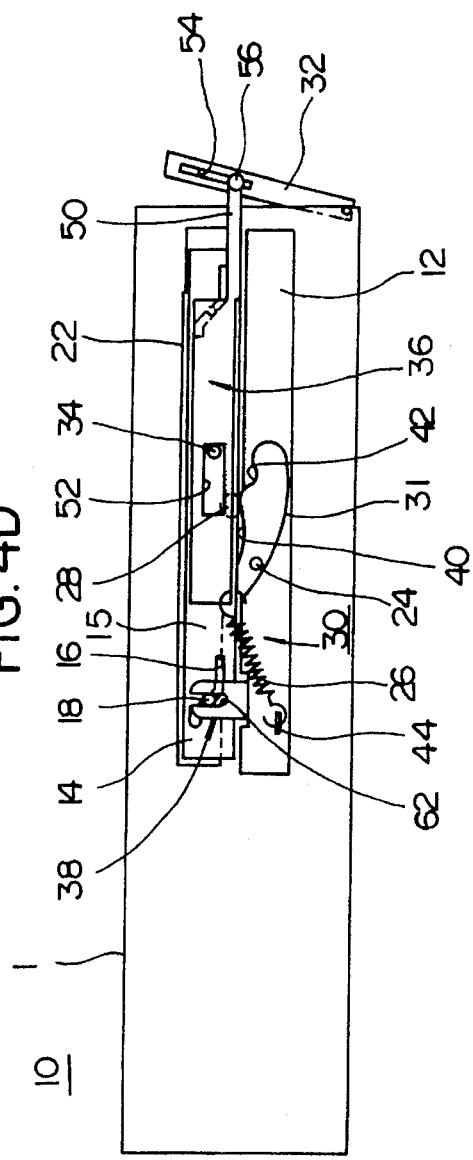

DISC PLAYER FOR PERFORMING DISC LOADING AND EJECTING IN RESPONSE TO OPENING AND CLOSING OF LID

BACKGROUND OF THE INVENTION

1. Field of the Invention

The present invention relates to a disc player, and more particularly to a disc player in which disc loading and ejecting are performed with closing and opening a player lid.

2. Description of the Prior Art

In general, a disc player has a deck including a turntable and a pickup, a moving plate mounted over the deck to be horizontally movable in forward and backward directions within a certain distance and a disc tray engaged with the moving plate and movable horizontally and vertically in response to the movement of the moving plate so that disc loading and ejecting are performed. Also, a motor and gears are mounted on a side of the deck in order to supply a driving force to the moving plate which has a rack portion meshed with the gears. Both sides of the moving plate are equipped with a pair of guide holes to horizontally and vertically guide the disc tray which has guide pins protruded to be inserted into the guide holes.

U.S. Pat. No. 4,893,295 (issued to Ryo Matsuura et al.) discloses a front loading disc player, which employs a motor and gears to load and eject a disc into and out of the player. In the above conventional disc player, there exists a drawback in that it is difficult to miniaturize the size of the disc player since due to the motor and gears and the structure of the disc player becomes complicated and requires much space therefor. There is another drawback in that reliability of the disc player decreases when a malfunction is caused by a trouble of a motor or a disconnection of the motor and various switches.

SUMMARY OF THE INVENTION

The object of the present invention is to provide a disc player wherein disc loading and ejecting are performed by a simple mechanical operation so that the disc player may be miniaturized and the reliability is improved. In order to achieve the above object, the disc player according to the present invention comprises:

a housing having a first guide groove longitudinally formed on an inner side thereof;
a deck including a turntable;
a moving plate mounted over the deck to horizontally move in frontward and rearward directions;
a disc tray engaged with the moving plate and for loading and ejecting a disc onto and out of the turntable while vertically moving down and up in response to rearward and frontward movements of the moving plate;
a lid engaged with the housing to pivotally close and open; and
means for controlling the frontward and rearward movements of the moving plate when the lid closes and opens.

According to the present invention, a simple structure and miniaturization of a disc player can be accomplished since disc loading and ejecting is performed by simply closing and opening a lid of the disc player without using a motor and gears.

BRIEF DESCRIPTION OF THE DRAWINGS

The foregoing and other advantages of features of the invention will become apparent from the following description of the preferred embodiment when considered together with the illustrations in the accompanying drawings, in which

FIGS. 4A to 4E are views for explaining a disc loading operation of the disc player according to one embodiment of the present invention.

DETAILED DESCRIPTION OF THE PREFERRED EMBODIMENT

Disc loading and ejecting operations of the disc player according to one embodiment of the present invention will be described in detail below with reference to the accompanying drawings.

Figure 1:
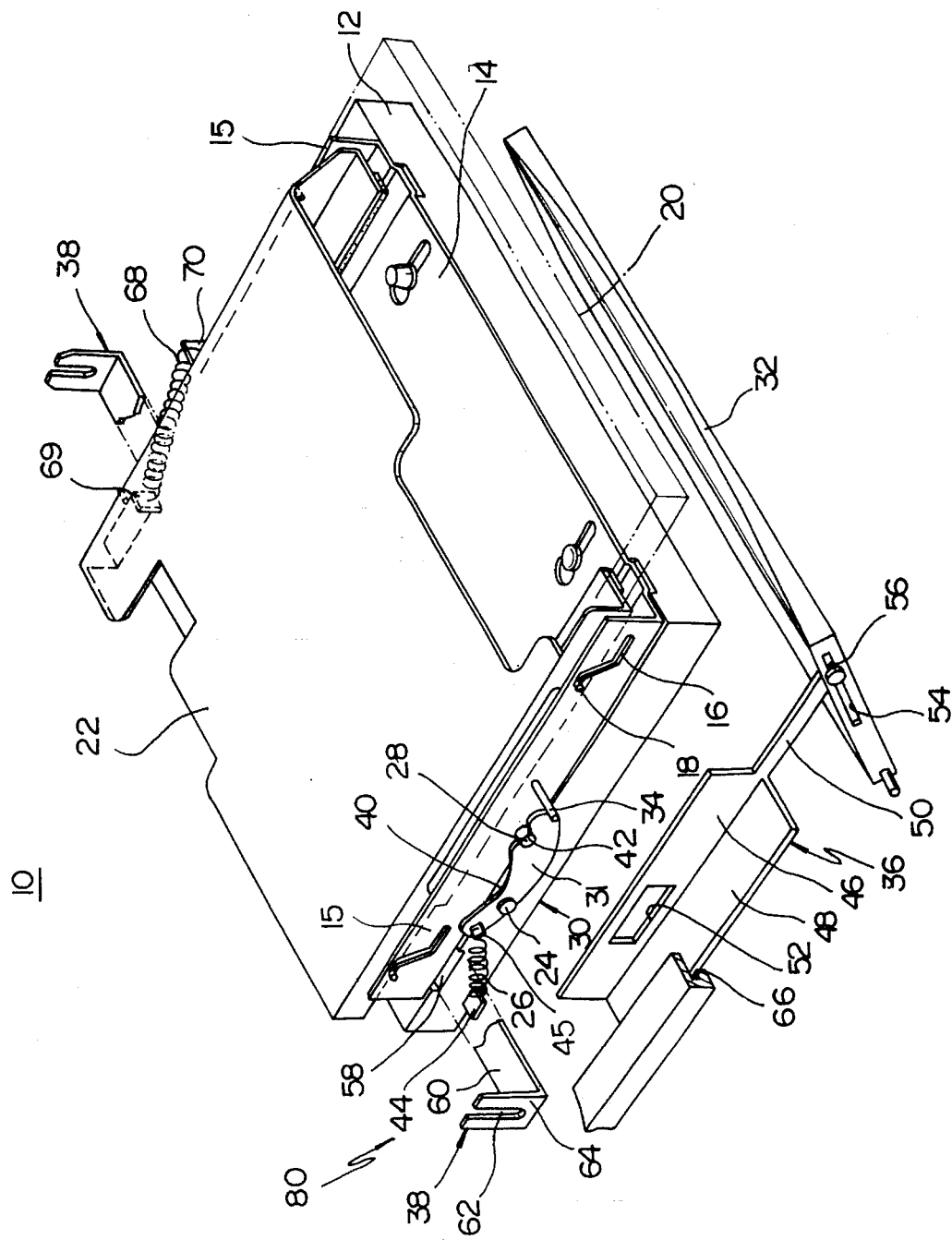
FIG. 1 is an explosive perspective view showing a disc loading apparatus of a disc player according to one embodiment of the present invention.
Figure 2:
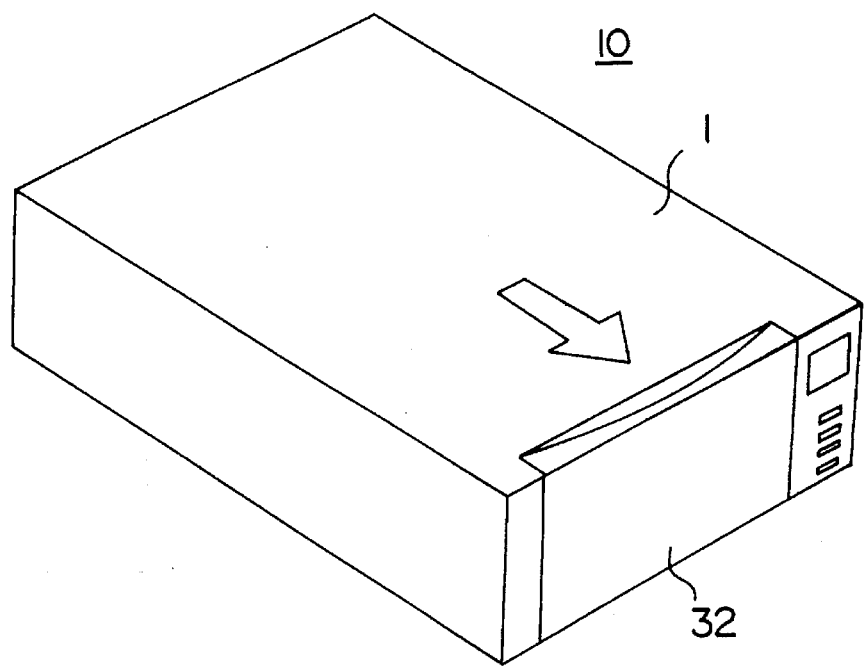
FIG. 2 is an assembled perspective view of FIG. 1 showing that the disc player lid is opened.
Figure 3:
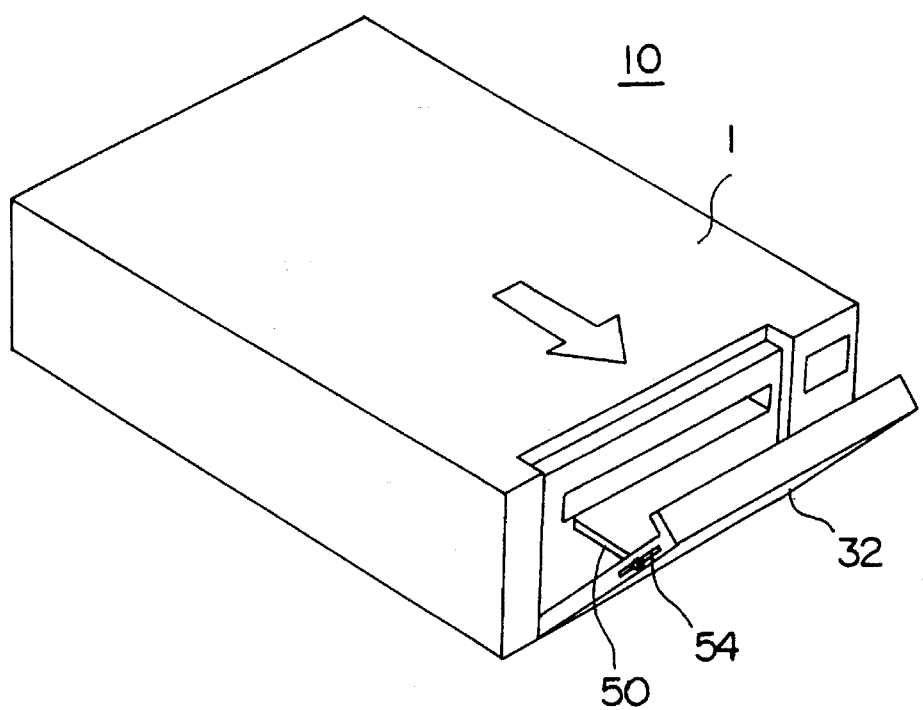
FIG. 3 is an assembled perspective view of FIG. 1 showing that the disc player lid is closed.

FIG. 1 is an explosive perspective view showing a disc loading apparatus of a disc player according to one embodiment of the present invention, FIG. 2 is an assembled perspective view of FIG. 1 showing that the disc player lid is opened, and FIG. 3 is an assembled perspective view of FIG. 1 showing that the disc player lid is closed.

As shown in FIGS. 1 to 3, the disc player according to one embodiment of the present invention includes a housing 1 having a first guide groove 66 longitudinally formed on an inner side thereof, a deck 12 including a turntable (not shown), a moving plate 14 mounted over deck 12 to horizontally move in frontward and rearward directions, a disc tray 22 engaged with moving plate 14 for loading and ejecting a disc 20 onto and out of the turntable while vertically moving down and up in response to rearward and frontward movements of moving plate 14, a lid 32 engaged with housing 1 to pivotally close and open, and a movement mechanism 80 for controlling the frontward and rearward movements of moving plate 14 when lid 32 closes and opens. Movement mechanism 80 has an operating member 36 engaged with lid 32 and horizontally moving in frontward and rearward directions in response to the opening and closing of lid 32, a limiting mechanism 30 for limiting a horizontal movement of moving plate 14 in frontward and rearward directions in response to the frontward and rearward movements of operating member 36, and a guiding member 38 mounted on a rear portion of deck 12 and for guiding disc tray 22 which vertically moves up and down in response to the frontward and rearward movements of moving plate 14.

Deck 12 includes a hinge pin 24 protruded from a rear portion of one side thereof, a first and a second spring engagement portions 44 and 69 formed on both sides thereof and behind hinge pin 24, and an engagement groove 58 transversely formed on the rear portion thereon.

Moving plate 14 has two side walls 15 and includes a fixing pin 28 protruded from a middle portion of one of side walls 15, and an operating pin 34 protruded in front of fixing pin 28, a fourth spring engagement portion 70 formed on the rear portion of the other of side walls 15 and a pair of guide holes 16 formed on the front and rear portions on both side walls 15.

Disc tray 22 includes guide pins 18 protruded therefrom and respectively inserted in guide holes 16.

Lid 32 includes a lid side hole 54 vertically formed on one side thereof. Operating member 36 includes an operating portion 46 having an operating pin engagement hole 52 longitudinally formed along one side of deck 12, a guide rib 48 rectangularly protruded outwards along a lower end of operating portion 46, and a connection portion 50 protruded from a front end of operating portion 46 and having a connection protrusion 56 at one end to be engaged with lid side hole 54 of lid 32.

Limiting mechanism 30 includes a limiting member 31 and a spring 26, wherein limiting member 31 rotatably engaged with hinge pin 24 has a guiding portion 40 and downwardly curved on a upper middle portion, a fixing pin receiving groove 42 formed on a front upper portion and for receiving fixing pin 28 of moving plate 14, and a third spring engagement portion 45 on a rear portion and wherein spring 26 connects third spring engagement portion 45 of limiting member 31 with first spring engagement portion 44 of deck 12.

Limiting mechanism 30 also includes a spring 68 connecting second spring engagement portion 69 of deck 12 with fourth spring engagement portion 70. Guiding member 38 includes an engagement rib 60 formed to be inserted along engagement groove 58 of deck 12, and a pair of guiding ribs 64 bent upwards at the right angle from both ends of engagement rib 60 and respectively having a second guide groove 62 longitudinally formed on the middle portion thereof.

Disc loading and ejecting operations of the disc player according to one embodiment of the present invention will be described in detail as below. FIGS. 4A to 4E are views for explaining disc loading operations of the disc player according to one embodiment of the present invention.

Figure 4E:
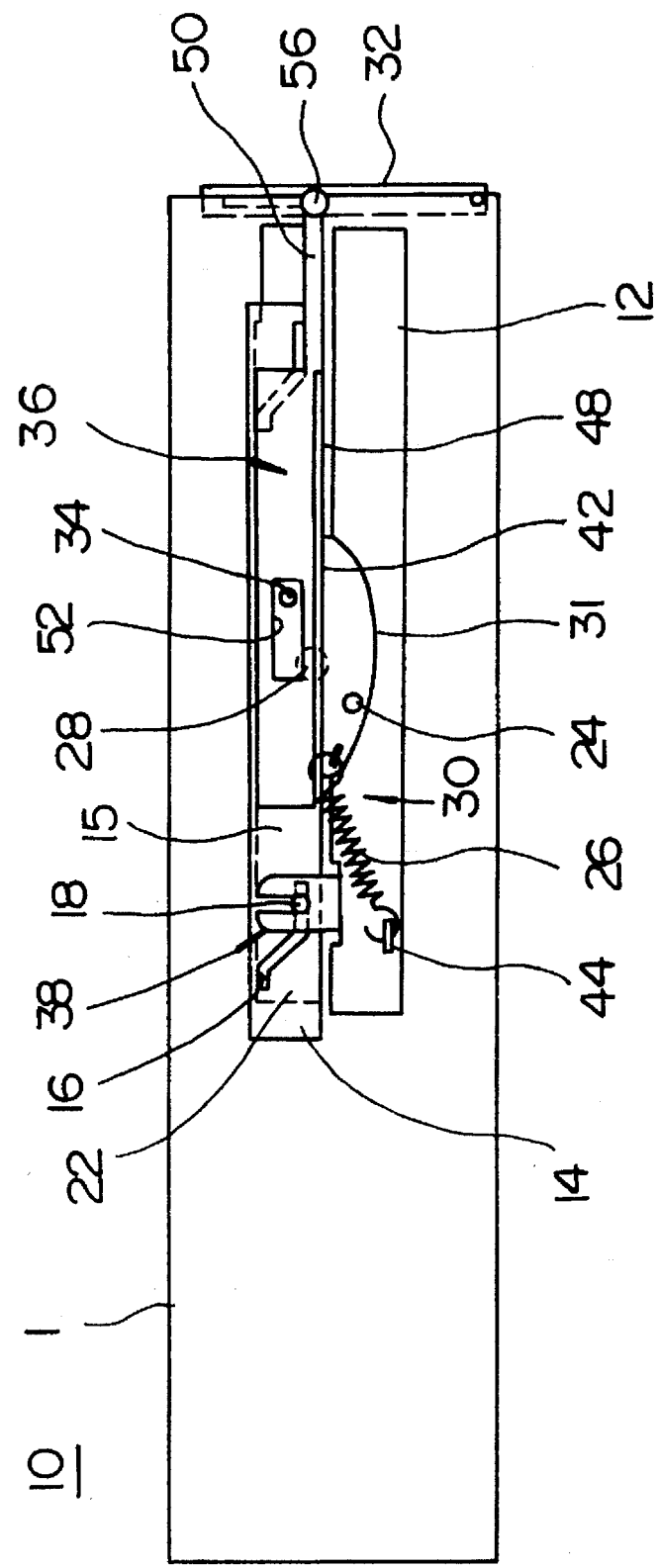

As shown in FIGS. 4A to 4E, when lid 32 of the disc player 10 is pulled from a closed state to an open state, disc tray 22 is raised over deck 12. In this state, disc 20 is inserted into disc tray 22 and lid 32 to pushed toward a closed state. Connection protrusion 56 of operating member 36, which is movably engaged with lid side hole 54 of lid 32, slides down along lid side hole 54 when lid 32 is pushed toward a close state. With connection protrusion 56 being slid down, guide rib 48 and operating portion 46 are gradually pushed in a rearward direction as shown in FIG. 4B. Operating pin engagement hole 52, which is formed in operating portion 46, is touched with operating pin 34 of moving plate 14 when operating portion 46 moves in a rearward direction, as shown in FIG. 4C. Therefore, a force closing lid 32 is applied to moving plate 14 so that moving plate 14 is pushed in a rearward direction. Accordingly, fixing pin 28 rested on fixing pin receiving groove 42, which is formed on a upper portion of limiting member 31 of limiting mechanism 30, is sliding along guiding portion 40 formed behind fixing pin receiving groove 42 after fixing pin 28 has come out of fixing pin receiving groove 42, as shown in FIG. 4D. At this time, limiting member 31 is turned down with support of hinge pin 24. With moving plate 14 pushed in a rearward direction as described above, disc tray 22 moves down along guide holes 16 of moving plate 14 since guide pins 18 of disc tray 22 are movably inserted into guide holes 16. Therefore, as shown in FIG. 4E, disc 20 is loaded on the turntable of deck 12. When disc tray 22 moves downwardly as described above, a pair of guide pins 18 formed on the rear portion of disc tray 22 are guided along second guide grooves 62 formed in guiding rib 64 of guiding member 38 which is mounted on the rear portion of deck 12, so that disc tray 22 moves down on deck 12 for disc 20 to exactly sit on the turntable.

Spring 68, which connects moving plate 14 with disc tray 22, applies a restoring force to moving plate 14 in a loading direction.

That is, when fixing pin 28 leaves fixing pin receiving groove 42 in response to the movement of moving plate 14, spring 68 serves to exactly sit on deck 12 by exerting a restoring force thereof.

Disc ejecting operation is performed in an exactly reverse way with respect to the above.

According to the present invention, a simple structure and miniaturization of a disc player can be accomplished since disc loading and ejecting is performed by simply closing and opening a lid of the disc player without using a motor and gears.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A disc player comprising:

a housing having a first guide groove longitudinally formed on an inner side thereof;

a deck including turntable;

a moving plate mounted over said deck to horizontally move in frontward and rearward directions;

a disc tray, engaged with said moving plate, for loading and ejecting a disc onto and out of said turntable while vertically moving down and up in response to rearward and frontward movements of said moving plate;

a lid engaged with said housing to pivotally close and open; and means for controlling frontward and rearward movements of said moving plate when said lid closes and opens, said controlling means, engaged with said lid and said moving plate, for moving said moving plate in rearward and frontward directions in response to the closing and opening operations of said lid whereby disc loading and ejecting operation of the disc player is performed, wherein said moving plate includes:

two side walls including a fixing pin protruded from a middle portion of said one side wall;

an operating pin protruded in front of said fixing pin;

a fourth spring engagement portion formed on the rear portion of the other said wall; and a pair of guide holes formed on front and rear portions of both said walls.

2. The disc player claimed in claim 1, wherein said disc player includes guide pins protruded therefrom and respectively inserted in said guide holes.

3. A disc player comprising:

a housing a first guide groove longitudinally formed on an inner side thereof;

a deck including turntable;

a moving plate mounted over said deck to horizontally move in frontward and rearward directions;

a disc tray, engaged with said moving plate, for loading and ejecting a disc onto and out of said turntable while vertically moving down and up in response to rearward and frontward movements of said moving plate;

a lid engaged with said housing to pivotally close and open; and means for controlling frontward and rearward movements of said moving plate when said lid closes and opens, said controlling means, engaged with said lid and said moving plate, for moving said moving plate in rearward and frontward directions in response to the closing and opening operations of said lid whereby disc loading and ejecting operation of the disc player is performed, wherein said housing includes a first guide groove, said controlling means comprises:

an operating member engaged with said lid and horizontally moving along said first guide groove in frontward and rearward directions in response to the opening and closing of said lid;

means for limiting horizontal movement of said moving plate in frontward and rearward directions in response to the frontward and rearward movements of said operating member; and a guiding member, mounted on a rear portion of said deck, for guiding said disc tray vertically upwards and downwards in response to the frontward and rearward movements of said moving plate, wherein said lid has a lid side hole vertically formed on one side, and said operating member further comprises:

an operating portion having an operating pin engagement hole longitudinally formed along one side of said deck;

a guide rib rectangularly protruded outward along a lower end of said operating portion; and a connection portion protruded from a front end of said operating portion and having a connection protrusion at one end to be engaged with said lid side hole of said lid.

4. A disc player comprising:

a housing having a first guide groove longitudinally formed on an inner side thereof;

a deck including a turntable, said deck including a hinge pin protruded from a rear portion of one side of said deck, a first and a second spring engagement portions formed on first and second sides of said deck and behind said hinge pin, and an engagement groove transversely formed on the rear portion;

a moving plate mounted over said deck and movable horizontally in frontward and rearward directions, said moving plate having two side walls, each side wall having a pair of guide holes formed on front and rear portions of the side wall, one of said walls including a fixing point protruded from a middle portion and an operating point protruded in front of said fixing pin, the other of said side walls having a fourth spring engagement portion formed on the rear portion; and a disc tray for loading and ejecting a disc onto and out of said turntable while vertically moving down and up in response to rearward and frontward movements of said moving plate, said disc tray being engaged with said moving plate;

a lid engaged with said housing to pivotally close and open, said lid having a lid side hole vertically formed on one side;

means for controlling frontward and rearward movements of said moving plate when said lid closes and opens, said controlling means, engaged with said lid and said moving plate, for moving said moving plate in rearward and frontward directions in response to closing and opening operations of said lid, whereby disc loading and ejecting operation of the disc player is performed;

said controlling means including an operating member engaged with said lid and horizontally moving in frontward and rearward directions in response to the opening and closing of said lid along the first guide groove;

means for limiting horizontal movement of said moving plate in frontward and rearward directions in response to frontward and rearward movements of said operating member; and a guiding member, mounted on a rear portion of said deck, for guiding said disc tray vertically upwards and downwards in response to the frontward and rearward movements of said moving plate, wherein said limiting means comprises:

a limiting member rotatably engaged with said hinge pin, said limiting member having a guiding portion downwardly curved on an upper middle portion, a fixing pin receiving groove formed on a front upper portion for receiving said fixing pin of said moving plate, and a third spring engagement portion on a rear portio; and a spring connecting said third spring engagement portion of said limiting member with said first spring engagement portion of said deck.

5. The disc player claimed in claim 4, wherein said limiting means comprises a spring connecting said second spring engagement portion of said deck with said fourth spring engagement portion.

6. The disc player claimed in claim 4, wherein said guiding member comprises:

an engagement rib insertable along said engagement groove of said deck; and a pair of guiding ribs bent upwards at a right angle from both ends of said engagement rib, each of said guiding ribs having a second guide groove longitudinally formed on a middle portion.

7. A disc player comprising:

a housing having a first guide groove longitudinally formed on an inner side thereof;

a deck including a turntable, said deck having a hinge pin protruded from a rear portion of one side, a first and a second spring engagement portions formed on both sides and behind said hinge pin and an engagement groove transversely formed on the rear portion;

a moving plate mounted over said deck to horizontally move in frontward and rearward directions;

a disc tray engaged with said moving plate and for loading and ejecting a disc onto and out of said turntable while vertically moving down and up in response to rearward and frontward movements of said moving plate;

a lid engaged with said housing to pivotally close and open, said lid having a lid side hole vertically formed on one side; and means for controlling the frontward and rearward movements of said moving plate when said lid closes and opens, said controlling means engaged with said lid and said moving plate for moving said moving plate in rearward and frontward directions in response to the closing and opening operations of said lid whereby disc loading and ejecting operation of the disc player is performed, said controlling means including:

an operating member engaged with said lid and horizontally moving in frontward and rearward directions in response to the opening and closing of said lid along the first guide groove, said operating member having an operating portion with an operating pin engagement hole longitudinally formed along one side of said deck, a guide rib rectangularly protruded outwards along a lower end of said operating portion and a connection portion protruded from a front end of said operating portion and having a connection protrusion at one end to be engaged with said lid side hole of said lid;

means for limiting a horizontal movement of said moving plate in frontward and rearward directions in response to the frontward and rearward movements of said operating member, said limiting means having a limiting member and a spring, said limiting member being rotatably engaged with said hinge pin, said limiting member having a guiding portion downwardly curved on an upper middle portion, a fixing pin receiving groove formed on a front upper portion for receiving said fixing pin of said moving plate, and a third spring engagement portion on a rear portion, said spring connecting said third spring engagement portion with said first spring engagement portion; and a guiding member, mounted on a rear portion of said deck, for guiding said disc tray vertically upwards and downwards in response to the frontward and rearward movements of said moving plate.

* * * * *